United States Patent
Huang et al.

(10) Patent No.: US 11,972,517 B2
(45) Date of Patent: Apr. 30, 2024

(54) ANIMATION GENERATION METHOD AND APPARATUS, ELECTRONIC DEVICE, AND COMPUTER-READABLE STORAGE MEDIUM

(71) Applicant: Beijing Bytedance Network Technology Co., Ltd., Beijing (CN)

(72) Inventors: Qiuhan Huang, Beijing (CN); Yan Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 133 days.

(21) Appl. No.: 17/790,474

(22) PCT Filed: Nov. 6, 2020

(86) PCT No.: PCT/CN2020/127228
§ 371 (c)(1),
(2) Date: Jun. 30, 2022

(87) PCT Pub. No.: WO2021/143310
PCT Pub. Date: Jul. 22, 2021

(65) Prior Publication Data
US 2023/0043150 A1    Feb. 9, 2023

(30) Foreign Application Priority Data
Jan. 15, 2020   (CN) .......................... 202010042968.6

(51) Int. Cl.
*G06T 13/80*   (2011.01)
*G06T 3/20*   (2006.01)
(Continued)

(52) U.S. Cl.
CPC .............. *G06T 13/80* (2013.01); *G06T 3/20* (2013.01); *G06T 3/40* (2013.01); *G06T 3/60* (2013.01); *G06T 11/001* (2013.01)

(58) Field of Classification Search
CPC .................. G06T 19/006; G06T 13/80; G06T 2207/10016; G06T 13/40; G06T 11/60;
(Continued)

(56) References Cited

U.S. PATENT DOCUMENTS 11,012,389 B2 * 5/2021 Garrido ................. H04L 51/046
2005/0225566 A1 * 10/2005 Kojo ..................... H04N 5/272
348/E5.058

(Continued)

FOREIGN PATENT DOCUMENTS

CN    101216888 A    7/2008
CN    101324963 A    12/2008
(Continued)

OTHER PUBLICATIONS

Willett NS, Kazi RH, Chen M, Fitzmaurice G, Finkelstein A, Grossman T. A mixed-initiative interface for animating static pictures. InProceedings of the 31st Annual ACM Symposium on User Interface Software and Technology Oct. 11, 2018 (pp. 649-661). (Year: 2018).*

(Continued)

*Primary Examiner* — Xiao M Wu
*Assistant Examiner* — Scott E Sonners
(74) *Attorney, Agent, or Firm* — Astute IP Law Group

(57) ABSTRACT

Provided are an method for generating an animation and apparatus, an electronic device, and a computer-readable storage medium. The method for generating an animation comprises: determining a background image and a first foreground image of an original image (S110); respectively rotating, scaling and translating the first foreground image
(Continued)

and a first 2D sticker image to obtain a second foreground image and a second 2D sticker image, wherein the first 2D sticker image is generated in advance on the basis of a predetermined coverage manner and according to the original image (S120); mixing the second foreground image with the background image to obtain a first mixed image (S130); and mixing the first mixed image with the second 2D sticker image to generate an animation of the original image (S140).

20 Claims, 2 Drawing Sheets

(51) Int. Cl.
  *G06T 3/40* (2006.01)
  *G06T 3/60* (2006.01)
  *G06T 11/00* (2006.01)

(58) Field of Classification Search
  CPC .............. G06T 2200/24; G06T 7/194; G06T 2207/30201; G06T 7/70; G06T 7/20; G06T 2207/30196; G06T 11/00; G06T 13/00; G06T 7/11; G06T 3/40; G06T 3/60; G06T 2219/2016; G06T 3/20; G06T 2213/08; G06T 2213/12; H04L 51/10; H04L 51/52; H04N 5/272; H04N 21/4788
  See application file for complete search history.

(56) References Cited

U.S. PATENT DOCUMENTS

| | | | |
|---|---|---|---|
| 2011/0249090 A1 | 10/2011 | Moore et al. | |
| 2013/0141439 A1* | 6/2013 | Kryzhanovsky | G06T 13/80 345/473 |
| 2013/0235081 A1 | 9/2013 | Ishibashi | |
| 2019/0236791 A1 | 8/2019 | Matsui | |
| 2019/0295303 A1 | 9/2019 | Wrotek | |

FOREIGN PATENT DOCUMENTS

| | | |
|---|---|---|
| CN | 103309557 A | 9/2013 |
| CN | 104318600 A | 1/2015 |
| CN | 106162137 A | 11/2016 |
| CN | 108014497 A | 5/2018 |
| CN | 109240689 A | 1/2019 |
| CN | 109685872 A | 4/2019 |
| CN | 109697689 A | 4/2019 |
| CN | 109859097 A | 6/2019 |
| CN | 110060320 A | 7/2019 |
| CN | 110099209 A | 8/2019 |
| CN | 110264546 A | 9/2019 |
| CN | 110378847 A | 10/2019 |
| CN | 111275800 A | 6/2020 |
| WO | 2019027483 A1 | 2/2019 |

OTHER PUBLICATIONS

International Search Report issued in corresponding International Application No. PCT/CN2020/127228 dated Jan. 27, 2021.
Chinese Office Action issued in corresponding Chinese Patent Application No. CN202010042968.6 dated Dec. 2, 2020.
Liwo, "How does PR add blur, How to add blur effect to video", May 4, 2017, Published by: https://card.weibo.com/article/h5/s#cid=230418692e466c01030wtd&vid=5746744093&extparam=&from=1085395014&wm=20004_90018&ip=117.136.38.60.
Kombuchi, "How is a PR video adding a snowflake effect", https://jingyan.baidu.com/article/6181c3e05236d7552efl538b.html, published Jan. 1, 2020.
Kemengguojiao, "How to make a picture in Photoshop frame clear in the middle of the blurred around the effect", Dec. 15, 2017, https://zhidao.baidu.com/question/425072354835341292.html.
Indian Office Action in Corresponding Indian Application No. IN202227037889 dated Nov. 14, 2022, 6 pages.
Extended European Search Report in EP20914604.2, dated Dec. 11, 2023, 9 pages.
Kazi et al., "Draco: Bringing Life to Illustrations with Kinetic Textures," CHI '14: Proceedings of the SIGCHI Conference on Human Factors in Computing Systems, Apr. 26-May 1, 2014, pp. 351-360.
Willett et al., "A Mixed-Initiative Interface for Animating Static Pictures," UIST '18: Proceedings of the 31st Annual ACM Symposium on User Interface Software and Technology, Oct. 14-17, 2018, pp. 649-661.

* cited by examiner

ANIMATION GENERATION METHOD AND APPARATUS, ELECTRONIC DEVICE, AND COMPUTER-READABLE STORAGE MEDIUM

This application is a 35 U.S.C. § 371 National Phase of International Application No. PCT/CN2020/127228, filed on Nov. 6, 2020, which claims priority to Chinese Patent Application No. 202010042968.6, filed on Jan. 15, 2020. Both of the aforementioned applications are hereby incorporated by reference in their entireties.

FIELD

The present disclosure relates to the field of image processing technology, and in particular to a method and device for generating an animation, an electronic apparatus, and a computer-readable storage medium.

BACKGROUND

A picture is a similar and vivid description or portrait of an objective object, which is the most common information carrier in human social activities. In an information sharing process, text information has a limited description ability, while pictures have the advantages of vivid and large amount of information. Animations are moving pictures, which are often more eye-catching than pictures. For example, on special festivals, special offers are presented in an animation interaction manner, so as to grab more people's attention.

At present, animations usually are produced by Flash animation, GIF picture or 3D animation, to display and spread richer information. However, during the specific implementation process, the inventors of the present disclosure found that: in the process of generating the above-mentioned animations, technicians usually manually align and create animations by using drawing tools, which relies on manual operations, resulting in high cost and low efficiency.

SUMMARY

The present disclosure aims to solve at least one of the above-mentioned technical defects, and this summary is provided to introduce concepts in a simplified form, which are described in detail in the detailed description below. This summary section is not intended to identify key features or essential features of the claimed technical solution, and is not intended to limit the scope of the claimed technical solution.

In one aspect, a method for generating an animation is provided. The method includes:
  determining a background image and a first foreground image of an original image;
  rotating, scaling and translating the first foreground image to obtain a second foreground image; and rotating, scaling and translating a first 2D sticker image to obtain a second 2D sticker image, wherein the first 2D sticker image is generated in advance from the original image based on a predetermined covering manner;
  mixing the second foreground image with the background image to obtain a first mixed image; and
  mixing the first mixed image with the second 2D sticker image to generate a micro animation of the original image.

In one aspect, a device for generating an animation is provided. The device includes:
  a determining module configured to determine a background image and a first foreground image of an original image;
  a processing module configured to rotate, scale and translate the first foreground image to obtain a second foreground image; and rotate, scale and translate a first 2D sticker image to obtain a second 2D sticker image, wherein the first 2D sticker image is generated in advance from the original image based on a predetermined covering manner;
  a first mixing module configured to mix the second foreground image with the background image to obtain a first mixed image; and
  a second mixing module configured to mix the first mixed image with the second 2D sticker image to generate an animation of the original image.

In one aspect, electronic apparatus is provided. The electronic apparatus includes: a memory; a processor; and a computer program stored on the memory and executable on the processor, wherein the computer program, when executed by the processor, implements the above method for generating an animation.

In one aspect, a computer-readable storage medium is provided. The computer-readable storage medium stores a computer program. The computer program, when executed by a processor, implements the above method for generating the animation.

In the method for generating the animation provided in the present disclosure, the background image of the original image is mixed with the second foreground image obtained by rotating, scaling and translating the first foreground image of the original image, to obtain the first mixed image. The first mixed image is mixed with the second 2D sticker image obtained by rotating, scaling and translating the first 2D sticker image, to generate an animation of the original image. In this way, a new way of automatically generating an animation is provided. The animation is generated automatically, and manual operations are greatly reduced, thus reducing development and production costs to the greatest extent and improving work efficiency in the process of generating the animation.

The additional aspects and advantages of the embodiments of the present disclosure are further described in the following description, which will become obvious from the following description or be understood through the disclosure of the present application.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale.

DETAILED DESCRIPTION

Figure 1:
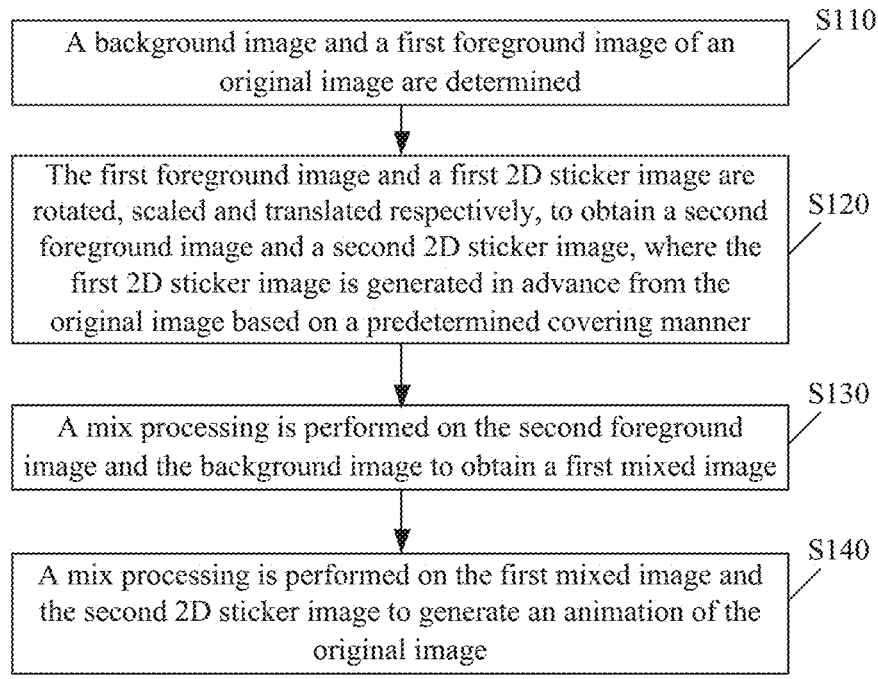
FIG. 1 is a schematic flow chart of a method for generating an animation according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or an omitted step that is not shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish devices, modules or units, are not used to limit the devices, modules or units to be different devices, modules or units, and are not used to limit an sequential order or interdependence of the functions performed by the devices, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

The names of messages or information interacted between multiple devices in the embodiments of the present disclosure are only for illustrative purposes, and are not intended to limit the scope of the messages or information.

To enable the objectives, technical solutions, and advantages of the embodiments of the present disclosure clearer, embodiments of the present disclosure are described in detail with reference to the accompanying drawings.

A method and device for generating an animation, an electronic apparatus and the computer-readable storage medium according to embodiments of the present disclosure are intended to address the above technical issues in the conventional technology.

The technical solutions of the embodiments of the present disclosure and how address the above technical issues by the technical solutions of the embodiments of the present disclosure will be described in detail below with the detailed embodiments. The several detailed embodiments below may be combined with each other, and the same or similar concepts or processes may not be repeated in some embodiments. The embodiments of the present disclosure are described below with reference to the accompanying drawings.

A method for generating an animation is provided in an embodiment of the present disclosure. The method is executed by a computer apparatus. The computer apparatus may be a terminal or a server. The terminal may be a desktop apparatus or a mobile terminal. A server may be a standalone physical server, a cluster of physical servers, or a virtual server. As shown in FIG. 1, the method includes steps S110 to S140.

In step S110, a background image and a first foreground image of an original image are determined.

Specifically, the animation is a moving picture. In the process of generating the animation from the picture, a series of processing may be performed on the image (i.e., the original image) in the picture, to generate the animation from the picture. In the process of performing a series of processing on the original image in the picture, a background image and a foreground image (donated as the first foreground image) of the original image may be determined first, so as to generate an animation from the picture based on the background image and the first foreground image, thus laying a necessary foundation for subsequent generation of animations.

In step S120, the first foreground image and a first 2D sticker image are rotated, scaled and translated respectively, to obtain a second foreground image and a second 2D sticker image, where the first 2D sticker image is generated in advance from the original image based on a predetermined covering manner.

Specifically, after the first foreground image of the original image is determined, the first foreground image may be rotated, scaled and translated to obtain a processed first foreground image, thereby providing a prerequisite for subsequent generation of animations. For the convenience of description, the processed first foreground image may be donated as a second foreground image.

Specifically, a corresponding 2D sticker may be drawn according to the original image, and the 2D sticker may be covered on the original image based on a predetermined covering manner to generate a 2D sticker mage (donated as the first 2D sticker image). The predetermined covering manner may be a Notblend covering manner. The Notblend covering manner may also be referred to as a direct covering manner.

In an example, the first 2D sticker image may be obtained by covering the entire original image with the 2D sticker using the Notblend covering manner, and then capturing the original image covered with the 2D sticker. The first 2D sticker image functions as a canvas with the 2D sticker on the top of the original image.

Specifically, after the first 2D sticker image is generated, the first 2D sticker image may be rotated, scaled and translated to obtain the processed first 2D sticker image, thereby providing a prerequisite for subsequent generation of animations. For the convenience of description, the processed first 2D sticker image may be denoted as a second 2D sticker image.

In step S130, a mix processing is performed on the second foreground image and the background image to obtain a first mixed image.

Specifically, after the second foreground image is obtained in step S120, the second foreground image may be mixed with the background image obtained in step S110 to obtain an image after the mix processing. For the convenience of description, the obtained image after the mix processing may be denoted as the first mixed image.

In step S140, a mix processing is performed on the first mixed image and the second 2D sticker image to generate an animation of the original image.

Specifically, after the first mixed image is obtained in step S130 and the second 2D sticker image is obtained in step S120, the first mixed image may be mixed with the second 2D sticker image to make the original image in the picture move, so as to generate an animation of the original image.

In the method for generating the animation provided in the embodiment of the present disclosure, the background image of the original image is mixed with the second foreground image obtained by rotating, scaling and translating the first foreground image of the original image, to obtain the first mixed image. The first mixed image is mixed with the second 2D sticker image obtained by rotating, scaling and translating the first 2D sticker image, to generate an animation of the original image. In this way, a new way of automatically generating an animation is provided. The animation is generated automatically, and manual operations are greatly reduced, thus reducing development and production costs to the greatest extent and improving work efficiency in the process of generating the animation.

The method according to an embodiment of the present disclosure is specifically introduced below.

In a possible implementation, in a process of determining the background image of the original image, a first scaling processing may be performed on the original image based on a first predetermined image edge in a first predetermined scaling factor, to obtain a first scaled image. Gaussian blurring processing is performed on the first scaled image to obtain the background image.

Figure 2:
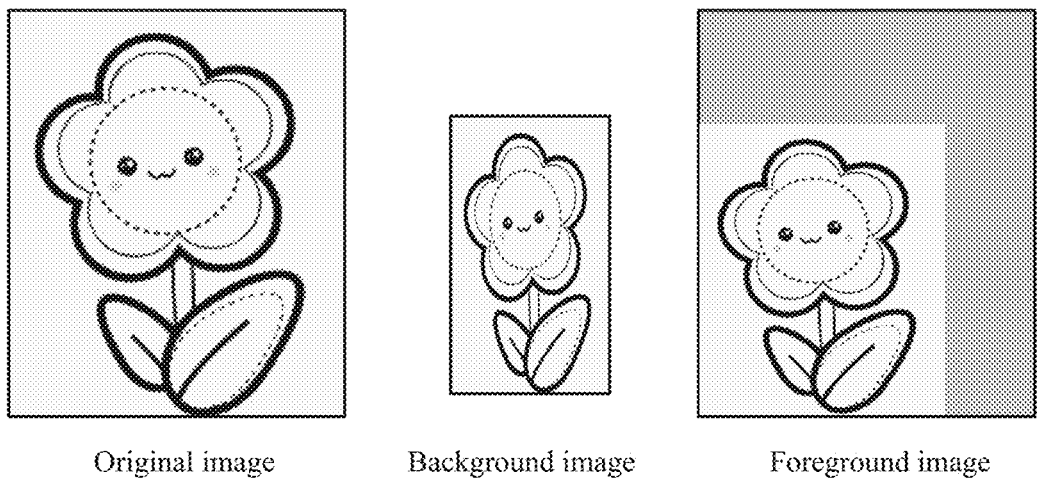
FIG. 2 is a schematic diagram of an original image, a background image, and a foreground image according to an embodiment of the disclosure.

Specifically, the original image may be a rectangular image as shown on the leftmost image of FIG. 2, or a square image. The original image may also be a polygonal image in other forms or styles, which will not be limited in the embodiment of the present application. The first predetermined scaling factor may be 3:4, 9:16, etc. Of course, the first predetermined scaling factor may also be other values, which will not be limited in the embodiment of the present application. The first predetermined image edge is any edge of the original image.

In an embodiment, the original image being the rectangular image shown on the leftmost image of FIG. 2 is taken as an example. If the first predetermined image edge is the short edge of the rectangular image and the first predetermined scaling factor is 9:16, a scaling processing (that is, the first scaling processing above-mentioned) is performed on the original image in 9:16 based on the short edge of the original image, to obtain the original image after the first scaling process. For the convenience of description, the image after the first scaling processing may be denoted as the first scaled image. In other words, the original image is scaled in 9:16 based on the short edge of the original image, to obtain the first scaled image with a size of 9:16. The first scaled image obtained may be the image shown in the middle image of FIG. 2.

Specifically, based on the above example, after the first scaled image with the size of 9:16 is obtained, it is also necessary to perform Gaussian blurring processing on the first scaled image with the size of 9:16. The first scaled image after Gaussian blurring processing is used as the background image of the original image. Gaussian blurring processing is also known as Gaussian smoothing process. Image noise and the level of detail may be reduced using Gaussian blurring process. From a perspective of mathematics, the Gaussian blurring processing of an image is to perform convolution on the image and a normal distribution.

Specifically, in a process of determining the foreground image of the original image (that is, the first foreground image), a second scaling processing may be performed on the original image based on a second predetermined image edge in a second predetermined scaling factor, to obtain the first foreground image. The first foreground image includes a blank area and the original image area after the second scaling process. An aspect ratio of the original image area after the second scaling processing is consistent with an aspect ratio of the original image.

In an example, the original image being the rectangular image shown on the leftmost image of FIG. 2 is still taken as an example. If the second predetermined image edge is the long edge of the rectangular image and the second predetermined scaling ratio is 9:16, a scaling processing (that is, the second scaling processing above-mentioned) is performed on the original image in 9:16 based on the long edge of the original image. In the second scaling process, when the aspect ratio of the original image area after the second scaling processing is the same as the aspect ratios of the original images, or when the error between the aspect ratio of the original image area after the second scaling processing and the aspect ratio of the original image is less than a predetermined threshold, it may be considered that the aspect ratio of the original image area after the second scaling processing is consistent with the aspect ratio of the original image. In other words, the first foreground image, obtained by scaling the original image to 9:16 based on the long edge of the original image, includes both the scaled image with a size of 9:16 and a blank area formed by the above scaling processing. The obtained first foreground image may be an image shown on the rightmost image of FIG. 2.

Specifically, based on the above example, after the first foreground image is obtained, the blank area in the first foreground image needs to be filled with a predetermined value, and the first foreground image filled with the predetermined value in the blank area is determined as the first foreground image of the original image. The predetermined value may be a value such as 0, 1, 2, or other values, which will not be limited in the embodiments of the present application. In addition, when the original image is a 4-channel image, the obtained first foreground image may also be a 4-channel image. In this case, when the blank area of the first foreground image is filed with a predetermined value (such as 0), it is required to fill with predetermined values in the four channels of the blank area.

In a possible implementation, in a process of rotating, scaling and translating the first foreground image, each foreground image texture coordinate of the first foreground image may be rotated, scaled and translated respectively. That is, the rotation, scaling and translation of the first foreground image is realized through the rotation, scaling and translation of each foreground image texture coordinate of the foreground image.

Specifically, if the first foreground image has N texture coordinates (that is, foreground image texture coordinates), which are a foreground image texture coordinate A, a foreground image texture coordinate B, . . . , a foreground image texture coordinate N. The rotation, scaling and translation for each foreground image texture coordinate of the N foreground image texture coordinates, may include: first, performing a coordinate rotation processing, based on a predetermined rotation center and a predetermined rotation parameter, on the foreground image texture coordinates, performing a coordinate scaling processing, based on a first predetermined scaling parameter, on the foreground image texture coordinates after the coordinate rotation processing; and then performing a coordinate translation processing, based on a predetermined translation vector and a predetermined translation time length, on the foreground image texture coordinates after the coordinate scaling processing.

The foreground image texture coordinates A is taken as an example below to introduce the rotation, scaling and translation of each foreground image texture coordinate in detail.

Specifically, in the process of performing a coordinate rotation processing, based on the predetermined rotation center and the predetermined rotation parameter, on the foreground image texture coordinates A, a first coordinate rotation processing may be performed first on the foreground image texture coordinates A in a first predetermined rotation formula based on the predetermined rotation center, to obtain a foreground image texture coordinate A after the first coordinate rotation processing (denoted as a first foreground image texture coordinate); then, a second coordinate rotation processing is performed on the first foreground image texture coordinate in a second predetermined rotation formula based on the predetermined rotation parameter, to obtain a first foreground image texture coordinate after the second coordinate rotation processing (denoted as a second foreground image texture coordinate).

In an example, the first predetermined rotation formula may be $Coord_1=Coord-Center$, where Coord represents the foreground image texture coordinate A, Center represents the predetermined rotation center, and $Coord_1$ represents the first foreground image texture coordinate. That is, the foreground image texture coordinate A is normalized to the predetermined rotation center.

In another example, the second predetermined rotation formula may be $$Coord_2 = \begin{bmatrix} \cos\theta t & \sin\theta t \\ \sin\theta t & -\cos\theta t \end{bmatrix} \cdot Coord_1,$$

where $Coord_1$ represents the first foreground image texture coordinate above-mentioned, θ represents the predetermined rotation parameter, the value of θ may range from 0 to π, and $Coord_2$ represents the second foreground image texture coordinate obtained by rotation.

Specifically, after coordinate rotation processing is performed on the foreground image texture coordinate A, based on the predetermined rotation center and the predetermined rotation parameter, the coordinate scaling processing may be performed, according to the first predetermined scaling parameter, on the foreground image texture coordinate A after the coordinate rotation processing (that is, the second foreground image texture coordinate). In the process of performing, based on the first predetermined scaling parameter, coordinate scaling processing on the foreground image texture coordinate after coordinate rotation process, the coordinate scaling processing may be performed on the second foreground image texture coordinate based on the first predetermined scaling parameter, to obtain third foreground image texture coordinate.

In an example, the first predetermined scaling parameter may be represented as λ, and the second foreground image texture coordinate are represented as the above-mentioned $Coord_2$. That is, coordinate scaling is performed on $Coord_2$ based on λ, to obtain a foreground image texture coordinate after the coordinate scaling processing (denoted as the third foreground image texture coordinate). The coordinate scaling processing may be performed in the following formula: $Coord_3=Coord_2/\lambda$, where $Coord_2$ represents the second foreground image texture coordinate, k represents the first predetermined scaling parameter, and $Coord_3$ represents the third foreground image texture coordinate.

Specifically, after performing, based on the first predetermined scaling parameter, the coordinate scaling processing on the foreground image texture coordinates after coordinate rotation processing, a coordinate translation processing is performed on the foreground image texture coordinate after the coordinate scaling processing (that is, the third foreground image texture coordinate), in a predetermined translation formula based on the predetermined translation vector and the predetermined translation time length. Before performing the coordinate translation processing on the foreground image texture coordinate after the coordinate scaling processing (that is, the third foreground image texture coordinate) in the predetermined translation formula based on the predetermined translation vector and the predetermined translation time length, a third coordinate rotation processing may be performed first on the third foreground image texture coordinate, in a third predetermined rotation formula based on the predetermined rotation center Center, to obtain a fourth foreground image texture coordinate. Then, the coordinate translation processing is performed on the fourth foreground image texture coordinate, in the predetermined translation formula based on the predetermined translation vector and the predetermined translation time length.

In one example, the third predetermined rotation formula may be $Coord_4=Coord_3+Center$, where $Coord_3$ represents the third foreground image texture coordinate, Center represents the predetermined rotation center, and $Coord_4$ represents the fourth foreground image texture coordinate. That is, the third foreground image texture coordinate is normalized to be restored to the predetermined rotation center.

In yet another example, the predetermined translation formula may be $Coord_5=Coord_4+(\lambda-1/2\lambda) \cdot (T_{total}-2t)/T_{total} \cdot \overrightarrow{Move}$, where $\overrightarrow{Move}$ represents the predetermined translation vector, $T_{total}$ represents the predetermined translation time length, $Coord_4$ represents the fourth foreground image texture coordinate, $t \in T_{total}$ represents each predetermined translation moment in the predetermined translation time length, and $Coord_5$ represents the foreground image texture coordinate after the translation processing.

It should be noted that taking the foreground image texture coordinate A of the first foreground image as an example above, specific introduction to the rotation, scaling and translation of the foreground image texture coordinates is given. The above method is also used to perform rotation, scaling and translation on other foreground image texture coordinates of the first foreground image. After the rotation, scaling and translation for all foreground image texture coordinates of the first foreground image are completed, the rotation, scaling and translation of the first foreground image may be completed.

In a possible implementation, in a process of rotating, scaling and translating the first 2D sticker image, the texture coordinates (denoted as sticker texture coordinates) of the first 2D sticker image are rotated, scaled and translated, respectively. That is, rotation, scaling and translation of the first 2D sticker image are realized through the rotation, scaling and translation of each sticker texture coordinate of the first 2D sticker image. The process of the rotation, scaling and translation of each sticker texture coordinate of the first 2D sticker image may include: first, performing a coordinate rotation processing on the sticker texture coordinates, based on a predetermined rotation center and a predetermined rotation parameter; performing a coordinate scaling processing, based on a first predetermined scaling parameter, on the sticker texture coordinates after the coordinate rotation processing; and then, performing a coordinate translation processing, based on a predetermined translation vector and a predetermined translation time length, on the sticker texture coordinates after coordinate scaling processing. A corresponding sticker image (denoted as the second 2D sticker image) may be obtained through the rotation, scaling and translation of the first 2D sticker image.

Specifically, the process of the rotation, scaling and translation of the sticker texture coordinates of the first 2D sticker image is similar to the above-mentioned process of the rotation, scaling and translation of foreground image texture coordinates of the first foreground image, and only the foreground image texture coordinates are replaced with the sticker texture coordinates, which will not be repeated herein.

In a possible implementation, after a second foreground image is obtained by the rotation, scaling and translation of the first foreground image, a mask layer may be superimposed on the second foreground image. The process of superimposing the mask layer on the second foreground image is a process of mixing the second foreground image with the background image of the original image. That is, after the second foreground image is obtained, the second background image and the background image of the original image may be mixed. An image after the mix processing (denoted as a first mixed image) may be obtained by mixing the second background image with the background image.

Specifically, the original image may be a 4-channel image, which includes the four channels, i.e., R channel, G channel, B channel and A channel. That is, the original image is an RGBA image. The value of each channel ranges from 0 to 1 respectively. When the original image is an RGBA image, the process of mixing the second foreground image with the background image of the original image may include: mixing the second foreground image with the background image of the original image according to a transparent channel (i.e., the A channel) of the second foreground image. In an example, mixing the second foreground image with the background image of the original image according to the transparency channel (i.e., the A channel) of the second foreground image may include: mixing a R channel of the second foreground image with a R channel of the background image, mixing a G channel of the second foreground image with a G channel of the background image, and mixing a B channel of the second foreground image with a B channel of the background image, according to the A channel of the second foreground image.

Specifically, after the first mixed image is obtained through the above mix processing, the first mixed image may be mixed with the second 2D sticker image to obtain an image after the mix processing, that is, an animation image of the original image. That is, an animation of the original image is generated. Before the first mixed image is mixed with the second 2D sticker image, a filter layer may be added to the first mixed image to obtain a first mixed image with the filter layer (referred to as a second mixed image), and then the second mixed image is mixed with the second 2D sticker image.

A method for generating an animation implemented by the present application is specifically introduced below through specific examples, which mainly includes the following steps.

In step 1, the original image is scaled in 9:16 based on a short edge, to obtain the first scaled image, and a Gaussian blurring processing is performed on the first scaled image to obtain a background image (denoted as $I_{bg}$) of the original image.

In step 2, the original image is scaled in 9:16 based on a long edge, to obtain a second scaled image, and the blank area of the second scaled image is filed with a predetermined value (0, 0, 0, 0) to obtain a first foreground image (denoted as $I_{fg\_1}$) of the original image.

In step 3, the 2D sticker is drawn in the Notblend method to obtain a first 2D sticker image (denoted as $I_{sticker\_1}$).

In step 4, $I_{bg}$ is drawn based on situ sampling.

In step 5, the rotation, scaling and translation are performed on the first foreground image $I_{fg}$ over time to obtain the second foreground image (denoted as $I_{fg\_2}$), which specifically includes the following sub-steps.

In a), a first coordinate rotation processing is performed on a current foreground image texture coordinate according to the predetermined rotation center, to obtain the first foreground image texture coordinate, where $Coord_1$=Coord−Center, Coord represents the current foreground image texture coordinate, and Center represents the predetermined rotation center, and $Coord_1$ represents the obtained first foreground image texture coordinate.

In b), the second coordinate rotation processing is performed on the first foreground image texture coordinate based on the predetermined rotation parameter θ, to obtain the second foreground image texture coordinate, where $$Coord_2 = \begin{bmatrix} \cos\theta t & \sin\theta t \\ \sin\theta t & -\cos\theta t \end{bmatrix} \cdot Coord_1,$$

$Coord_1$ represents the first foreground image texture coordinate, θ represents the predetermined rotation parameter, the value of θ may range from 0 to π, and $Coord_2$ represents the second foreground image texture coordinate obtained by rotation.

In c), a coordinate scaling processing is performed on the second foreground image texture coordinate based on the first predetermined scaling parameter, to obtain the third foreground image texture coordinate, where $Coord_3$=$Coord_2$/λ, $Coord_2$ represents the second foreground image texture coordinate, and λ represents the first predetermined scaling parameter, and $Coord_1$ represents the third foreground image texture coordinate.

In d), a third coordinate rotation processing is performed on the third foreground image texture coordinate based on the predetermined rotation center, to obtain the fourth foreground image texture coordinate, where $Coord_4$=$Coord_3$+Center, $Coord_3$ represents the third foreground image texture coordinate, Center represents the predetermined rotation center, and $Coord_4$ represent the fourth foreground image texture coordinate.

In e), a translation processing is performed on the third foreground image texture coordinate based on the predetermined translation vector and the predetermined translation time length, at each predetermined translation moment of the predetermined translation time length, where $Coord_5 = Coord_4 + (\lambda - 1/2\lambda) \cdot (T_{total} - 2t)/T_{total}$. $\overrightarrow{Move}$, $\overrightarrow{Move}$ represents the represents the predetermined translation vector, $T_{total}$ represents the predetermined translation time length, $Coord_4$ represents the fourth foreground image texture coordinate, $t \in T_{total}$ represents each predetermined translation moment in the predetermined translation time length, and $Coord_5$ represents the foreground image texture coordinate after translation processing.

In step 6, the second foreground image $I_{fg\_2}$ is mixed with the background image $I_{bg}$ to obtain the first mixed image (denoted as $I_{mix\_1}$).

In step 7, a filter layer is added to the first mixed image to obtain the second mixed image (denoted as $I_{mix\_2}$).

In step 8, operations of sub-steps in step 5 are performed on the first 2D sticker image $I_{sticker\_1}$ to obtain the second 2D sticker image (denoted as $I_{sticker\_2}$).

In step 9, the second mixed image $I_{mix\_2}$ is mixed with the second 2D sticker image $I_{sticker\_2}$ to generate an animation of the original image.

Figure 3:
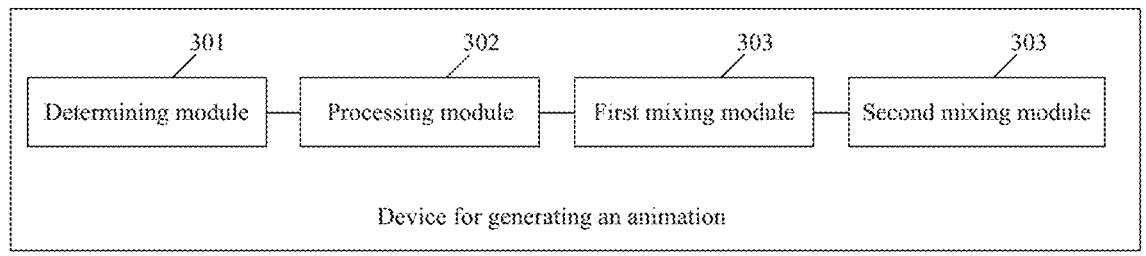
FIG. 3 is a schematic diagram of a basic structure of a device for generating an animation according to an embodiment of the present disclosure.

FIG. 3 is a schematic structural diagram of a device for generating an animation provided in yet another embodiment of the present disclosure. As shown in FIG. 3, the device 300 may include a determining module 301, a processing module 302, a first mixing module 303 and a second mixing module 304.

The determining module 301 is configured to determine a background image and a first foreground image of an original image.

The processing module 302 is configured to rotate, scale and translate the first foreground image to obtain a second foreground image; and rotate, scale and translate a first 2D sticker image to obtain a second 2D sticker image, where the first 2D sticker image is generated in advance from the original image based on a predetermined covering manner.

The first mixing module 303 is configured to mix the second foreground image with the background image to obtain a first mixed image.

The second mixing module 304 is configured to mix the first mixed image with the second 2D sticker image to generate an animation of the original image.

In a possible implementation, when determining the background image of the original image, the determining module is configured to perform a first scaling processing on the original image by a first predetermined scaling factor based on a first predetermined image edge, to obtain a first scaled image; and to perform Gaussian blurring processing on the first scaled image to obtain the background image.

When determining the first foreground image of the original image, the determining module is configured to perform a second scaling processing on the original image by a second predetermined scaling factor based on a second predetermined image edge, to obtain a first foreground image. The first foreground image includes a blank area and an original image area after the second scaling processing, and an aspect ratio of the original image area after the second scaling processing is consistent with an aspect ratio of the original image.

In a possible implementation, when the first foreground image is rotated, scaled and translated, the processing module is configured to rotate, scale and translate each foreground image texture coordinate of the first foreground image.

When each foreground image texture coordinate of the first foreground image is rotated, scaled and translated, the processing module is configured to:
perform a coordinate rotation processing on the foreground image texture coordinate, based on a predetermined rotation center and a predetermined rotation parameter;
perform, based on a first predetermined scaling parameter, a coordinate scaling processing on a foreground image texture coordinate after the coordinate rotation processing; and
perform, based on a predetermined translation vector and a predetermined translation time length, a coordinate translation processing on a foreground image texture coordinate after the coordinate scaling processing.

In a possible implementation, when a coordinate rotation processing is performed on the foreground image texture coordinate, based on the predetermined rotation center and the predetermined rotation parameter, the processing module is configured to:
perform a first coordinate rotation processing on the foreground image texture coordinate by using a first predetermined rotation formula based on the predetermined rotation center, to obtain a first foreground image texture coordinate; and
perform a second coordinate rotation processing on the first foreground image texture coordinate by using a second predetermined rotation formula based on the predetermined rotation parameter, to obtain a second foreground image texture coordinate.

In a possible implementation, when the coordinate scaling processing is performed on the foreground image texture coordinate after the coordinate rotation process, based on the first predetermined scaling parameter, the processing module is further configured to:
perform the coordinate scaling processing on the second foreground image texture coordinate based on the first predetermined scaling parameter, to obtain a third foreground image texture coordinate.

In a possible implementation, when the coordinate translation processing is performed on the foreground image texture coordinate after the coordinate scaling process, according to the predetermined translation vector and the predetermined translation time length, the processing module is further configured to:
perform a translation processing on the third foreground image texture coordinate, by using a predetermined translation formula based on the predetermined translation vector and the predetermined translation time length, at each predetermined translation moment of the predetermined translation time length.

In a possible implementation, the device 300 further includes a rotating module.

The rotation module is configured to perform a third coordinate rotation processing on the third foreground image texture coordinate by using a third predetermined rotation formula based on the predetermined rotation center, to obtain a fourth foreground image texture coordinate.

When the translation processing is performed on the third texture coordinate by using a predetermined translation formula based on the predetermined translation vector and the predetermined translation time length, at each predetermined translation moment of the predetermined translation time length, the processing module is further configured to:
perform the translation processing on the fourth foreground image texture coordinate, by using the predetermined translation formula based on the predetermined translation vector and the predetermined translation time length, at each predetermined translation moment of the predetermined translation time length.

In a possible implementation, when the first 2D sticker image is rotated, scaled and translated, the processing module is configured to rotate, scale and translate each sticker texture coordinate of the first 2D sticker image;

When each sticker texture coordinate of the first 2D sticker image is rotated, scaled and translated, the processing module is further configured to:

perform a coordinate rotation processing on the sticker texture coordinate, based on a predetermined rotation center and a predetermined rotation parameter;

perform, based on the first predetermined scaling parameter, a coordinate scaling processing on the sticker texture coordinate after the coordinate rotation processing; and perform, based on a predetermined translation vector and a predetermined translation time length, a coordinate translation processing on the sticker texture coordinate after the coordinate scaling processing.

In a possible implementation, the original image is a 4-channel image with a R channel, a G channel, a B channel and an A channel.

The first mixing module is configured to mix a R channel of the second foreground image with a R channel of the background image, to mix a G channel of the second foreground image with a G channel of the background image, and to mix a B channel of the second foreground image with a B channel of the background image, according to an A channel of the second foreground image.

In a possible implementation, the device 300 further includes a filter module.

The filter module is configured to add a filter layer to the first mixed image to obtain a second mixed image.

The second mixing module is configured to mix the second mixed image with the second 2D sticker image.

In the method for generating the animation provided in the present disclosure, the background image of the original image is mixed with the second foreground image obtained by rotating, scaling and translating the first foreground image of the original image, to obtain the first mixed image. The first mixed image is mixed with the second 2D sticker image obtained by rotating, scaling and translating the first 2D sticker image, to generate an animation of the original image. In this way, a new way of automatically generating an animation is provided. The animation is generated automatically, and manual operations are greatly reduced, thus reducing development and production costs to the greatest extent and improving work efficiency in the process of generating the animation.

It should be noted that, this embodiment is a device embodiment corresponding to the method embodiment above-mentioned, and this embodiment may be implemented in cooperation with the method embodiment above-mentioned. The relevant technical details mentioned in the method embodiment above are valid in this embodiment, and are not repeated here in order to reduce repetition. Correspondingly, the relevant technical details mentioned in this embodiment may also be applied to the method embodiment above.

Figure 4:
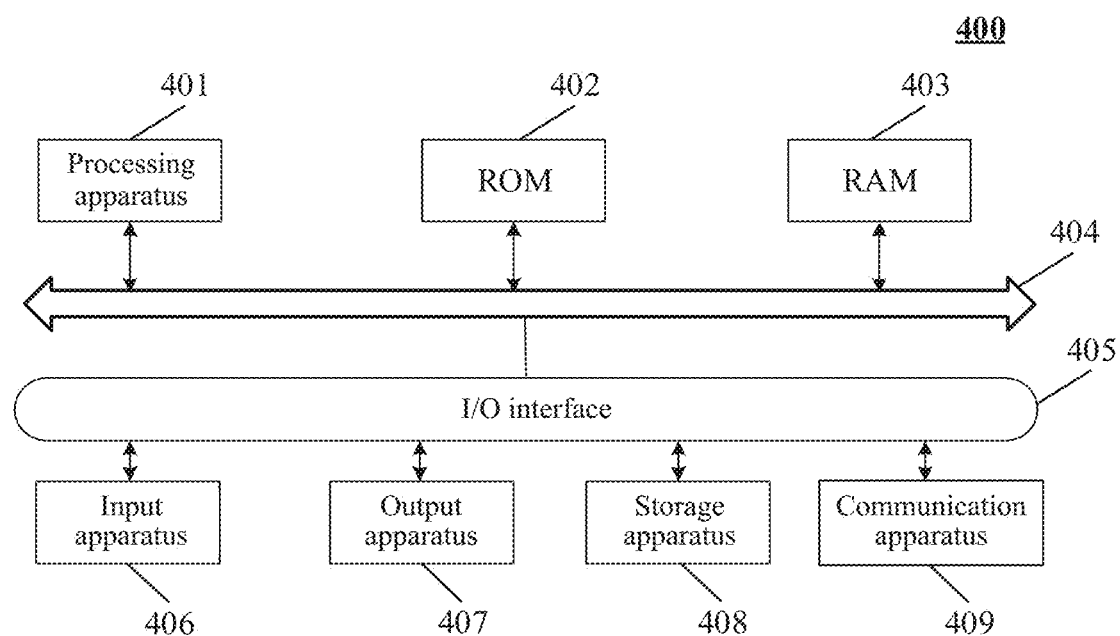
FIG. 4 is a schematic structural diagram of an electronic apparatus according to an embodiment of the disclosure.

Reference is made to FIG. 4, which shows a schematic structural diagram of an electronic apparatus 400 suitable for implementing the embodiments of the present disclosure. The terminal equipment according to the embodiments of the present disclosure may include, but are not limited to, mobile terminals, such as mobile phones, laptops, digital broadcast receivers, PDAs (personal digital assistants), PADs (tablet PCs), PMPs (portable multimedia players), vehicle-mounted terminals (such as in-vehicle navigation terminals) and the like, and fixed terminals such as digital TVs, desktop computers, and the like. The electronic apparatus shown in FIG. 4 is only an example, and should not indicate any limitation to the function and application scope of the embodiments of the present disclosure.

The electronic apparatus includes a memory and a processor, and the processor here may be referred to as a processing apparatus 401 described below, and the memory includes at least one of a Read Only Memory (ROM) 402, a Random Access Memory (RAM) 403 and a storage apparatus 408 hereinafter, which are shown in detail below:

As shown in FIG. 4, the electronic apparatus 400 may include a processing device 401, such as a central processing unit or a graphics processor, which may execute various operations and processing through a program stored in a Read Only Memory (ROM) 402 or a program loaded from the storage apparatus 408 into a Random Access Memory (RAM) 403. The RAM 403 is further configured to store various programs and data required by the electronic apparatus 400. The processing apparatus 401, the ROM 402 and the RAM 403 are connected to each other through a bus 404. An Input/output (I/O) interface 405 is also connected to the bus 404.

Generally, the I/O interface 405 may be connected to: an input apparatus 406, such as a touch screen, a touch panel, a keyboard, a mouse, a camera, a microphone, an accelerometer, and a gyroscope; an output apparatus 407, such as a liquid crystal display (LCD), a speaker, and a vibrator; a storage apparatus 408 such as a magnetic tape and a hard disk; and a communication apparatus 409. The communication apparatus 409 may enable wireless or wired communication between the electronic apparatus 400 and other equipment for data exchanging. Although FIG. 4 shows electronic apparatus 400 having various devices, it should be understood that the illustrated device are not necessarily required to all be implemented or included. Alternatively, more or fewer devices may be implemented or included.

Particularly, according to an embodiment of the present disclosure, the process described above in conjunction with flow charts may be implemented as a computer program. For example, a computer program product is further provided as an embodiment in the present disclosure, including a computer program carried on a computer readable medium. The computer program includes program code for performing the method shown in the flow charts. In the embodiment, the computer program may be downloaded and installed from the network via the communication apparatus 409, or installed from the storage apparatus 408, or installed from the ROM 402. When the computer program is executed by the processing apparatus 401, the above-mentioned functions defined in the method according to the embodiment of the present disclosure are performed.

It is to be noted that, the computer readable medium mentioned herein may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. Specific examples of the computer readable storage medium may include, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: a wire, an optical cable, RF(radio frequency) and the like, or any proper combination thereof.

The computer readable medium may be incorporated in the electronic apparatus, or may exist alone without being assembled into the electronic apparatus.

The computer readable medium carries one or more programs. The one or more programs, when being executed by the electronic apparatus, cause the electronic apparatus to: determine a background image and a first foreground image of an original image; rotate, scale and translate the first foreground image to obtain a second foreground image, and rotate, scale and translate a first 2D sticker image to obtain a second 2D sticker image, wherein the first 2D sticker image is generated in advance from the original image based on a predetermined covering manner; mix the second foreground image with the background image to obtain a first mixed image; and mix the first mixed image with the second 2D sticker image to generate a micro animation of the original image.

The computer program code for performing the operations of the present disclosure may be written in in one or more programming languages or combinations thereof. The programming languages includes an object-oriented programming language, such as Java, Smalltalk, C++, and a conventional procedural programming language, such as C language or similar programming language. The program code may be executed entirely on a user computer, partially on the user computer, as an independent software package, partially on the user computer and partially on a remote computer, or entirely on the remote computer or a server. In a case involving a remote computer, the remote computer may be connected to a user computer or an external computer through any kind of network including a local area network (LAN) or a wide area network (WAN). For example, the remote computer may be connected through Internet connection supported by an Internet service provider.

Flow charts and block diagrams in the drawings illustrate the architecture, functions and operations that can be implemented by the system, method and computer program product according to the embodiments of the present disclosure. Each block in a flow chart or a block diagram may represent a module, a program segment, or a part of code, and part of the module, program segment, or part of code contains one or more executable instructions for implementing the specified logical function. It should be noted that, in some alternative implementations, the functions marked in blocks may be performed in an order different from the order as shown in the drawings. For example, two blocks shown in succession may actually be executed in parallel, or sometimes may be executed in a reverse order, which depends on the functions involved. It is to be noted that each block in a block diagram and/or flow chart, and a combination of the blocks in a block diagram and/or flow chart, may be implemented by a dedicated hardware-based system that performs the specified functions or operations, or may be realized by a combination of dedicated hardware and computer instructions.

The modules or units mentioned in the description of the embodiments of the present disclosure may be implemented by means of software, or otherwise by means of hardware. In some circumstances, the name of a module or a unit does not constitute a limitation on the unit itself, for example, an acquiring module is also described as "a module configured to acquire at least one event processing method corresponding to a predetermined live event when occurrence of the predetermined live event is detected".

The functions described herein above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium containing or storing a program, and the program is used by or in combination with an instruction execution system, apparatus or device. The machine-readable medium may be a machine-readable signal medium or a machine-readable storage medium. The machine-readable medium may include, but is not limited to, a system, an apparatus, or a device in an electronic, magnetic, optical, electromagnetic, infrared, or semi-conductive form, or any suitable combination thereof. Specific examples of machine-readable storage medium may include an electrical connection with one or more wires, a portable computer disk, a hard disks, a random access memory (RAM), a read only memory (ROM), an erasable programmable read only memory (EPROM or flash memory), an optical fiber, a portable compact disk read only memory (CD-ROM), a light storage device, a magnetic storage device, or any suitable combination thereof.

A method for generating an animation is provided according to one or more embodiments of the present disclosure, the method includes:
  determining a background image and a first foreground image of an original image;
  rotating, scaling and translating the first foreground image to obtain a second foreground image; and rotating, scaling and translating a first 2D sticker image to obtain a second 2D sticker image, wherein the first 2D sticker image is generated in advance from the original image based on a predetermined covering manner;
  mixing the second foreground image with the background image to obtain a first mixed image; and
  mixing the first mixed image with the second 2D sticker image to generate a micro animation of the original image.

In a possible implementation, determining the background image of the original image includes:

performing a first scaling processing on the original image by a first predetermined scaling factor based on a first predetermined image edge to obtain a first scaled image, and performing a Gaussian blurring processing on the first scaled image to obtain the background image;

the determining the first foreground image of the original image including:

performing a second scaling processing on the original image by a second predetermined scaling factor based on a second predetermined image edge, to obtain the first foreground image, wherein the first foreground image includes a blank area and an original image area after the second scaling processing, and an aspect ratio of the original image area after the second scaling processing is consistent with an aspect ratio of the original image.

In a possible implementation, rotating, scaling and translating the first foreground image includes:

rotating, scaling and translating each foreground image texture coordinate of the first foreground image; and the rotating, scaling and translating each foreground image texture coordinate of the first foreground image includes:

performing a coordinate rotation processing on the foreground image texture coordinate, based on a predetermined rotation center and a predetermined rotation parameter;

performing, based on a first predetermined scaling parameter, a coordinate scaling processing on a foreground image texture coordinate after the coordinate rotation processing; and performing, based on a predetermined translation vector and a predetermined translation time length, a coordinate translation processing on a foreground image texture coordinate after the coordinate scaling processing.

In a possible implementation, the performing a coordinate rotation processing on the foreground image texture coordinate, based on the predetermined rotation center and the predetermined rotation parameter includes:

performing a first coordinate rotation processing on the foreground image texture coordinate, by using a first predetermined rotation formula based on the predetermined rotation center, to obtain a first foreground image texture coordinate; and performing a second coordinate rotation processing on the first foreground image texture coordinate by using a second predetermined rotation formula based on the predetermined rotation parameter, to obtain a second foreground image texture coordinate.

In a possible implementation, the performing, based on the first predetermined scaling parameter, a coordinate scaling processing on a foreground image texture coordinate after the coordinate rotation processing includes:

performing the coordinate scaling processing on the second foreground image texture coordinate based on the first predetermined scaling parameter, to obtain a third foreground image texture coordinate.

In a possible implementation, the performing, based on a predetermined translation vector and a predetermined translation time length, a coordinate translation processing on a foreground image texture coordinate after the coordinate scaling processing includes:

performing the translation processing on the third foreground image texture coordinate, by using the predetermined translation formula based on the predetermined translation vector and the predetermined translation time length, at each predetermined translation moment of the predetermined translation time length.

In a possible implementation, before performing the translation processing on the third foreground image texture coordinate, by using the predetermined translation formula based on the predetermined translation vector and the predetermined translation time length, at each translation moment of the predetermined translation time length, the method further includes:

performing a third coordinate rotation processing on the third foreground image texture coordinate by using a third predetermined rotation formula based on the predetermined rotation center, to obtain a fourth foreground image texture coordinate; and the performing a translation processing on the third texture coordinate, by using the predetermined translation formula based on the predetermined translation vector and the predetermined translation time length, at each predetermined translation moment of the predetermined translation time length includes:

performing the translation processing on the fourth foreground image texture coordinate, by using the predetermined translation formula based on the predetermined translation vector and the predetermined translation time length, at each predetermined translation moment of the predetermined translation time length.

In a possible implementation, the rotating, scaling and translating the first 2D sticker image includes:

rotating, scaling and translating each sticker texture coordinate of the first 2D sticker image; and the rotating, scaling and translating each sticker texture coordinate of the first 2D sticker image includes:

performing the coordinate rotation processing on the sticker texture coordinate, based on the predetermined rotation center and the predetermined rotation parameter;

performing, based on the first predetermined scaling parameter, the coordinate scaling processing on a sticker texture coordinate after the coordinate rotation processing; and performing, based on the predetermined translation vector and the predetermined translation time length, the coordinate translation processing on a sticker texture coordinate after the coordinate scaling processing.

In a possible implementation, the original image is a 4-channel image with a R channel, a G channel, a B channel and an A channel.

The mixing the second foreground image with the background image includes:

mixing a R channel of the second foreground image with a R channel of the background image, mixing a G channel of the second foreground image with a G channel of the background image, and mixing a B channel of the second foreground image with a B channel of the background image, according to an A channel of the second foreground image.

In a possible implementation, before mixing the first mixed image with the second 2D sticker image, the method further includes:

adding a filter layer to the first mixed image to obtain a second mixed image; and the mixing the first mixed image with the second 2D sticker image includes:

mixing the second mixed image with the second 2D sticker image.

A device for generating an animation is provided according to one or more embodiments of the present disclosure. The device includes:

a determining module configured to determine a background image and a first foreground image of an original image;

a processing module configured to rotate, scale and translate the first foreground image to obtain a second foreground image; and rotate, scale and translate a first 2D sticker image to obtain a second 2D sticker image, wherein the first 2D sticker image is generated in advance from the original image based on a predetermined covering manner;

a first mixing module configured to mix the second foreground image with the background image to obtain a first mixed image; and a second mixing module configured to mix the first mixed image with the second 2D sticker image to generate an animation of the original image.

In a possible implementation, when determining the background image of the original image, the determining module is configured to perform a first scaling processing on the original image by a first predetermined scaling factor based on a first predetermined image edge, to obtain a first scaled image; and to perform Gaussian blurring processing on the first scaled image to obtain the background image.

When determining the first foreground image of the original image, the determining module is configured to perform a second scaling processing on the original image by a second predetermined scaling factor based on a second predetermined image edge, to obtain a first foreground image. The first foreground image includes a blank area and an original image area after the second scaling process, and an aspect ratio of the original image area after the second scaling processing is consistent with an aspect ratio of the original image.

In a possible implementation, when the first foreground image is rotated, scaled and translated, the processing module is configured to rotate, scale and translate each foreground image texture coordinate of the first foreground image.

When each foreground image texture coordinate of the first foreground image is rotated, scaled and translated, the processing module is configured to:

perform a coordinate rotation processing on the foreground image texture coordinate, based on a predetermined rotation center and a predetermined rotation parameter;

perform, based on a first predetermined scaling parameter, a coordinate scaling processing on a foreground image texture coordinate after the coordinate rotation processing; and perform, based on a predetermined translation vector and a predetermined translation time length, a coordinate translation processing on a foreground image texture coordinate after the coordinate scaling processing.

In a possible implementation, when a coordinate rotation processing is performed on the foreground image texture coordinate, based on the predetermined rotation center and the predetermined rotation parameter, the processing module is configured to:

perform a first coordinate rotation processing on the foreground image texture coordinate, by using a first predetermined rotation formula based on the predetermined rotation center, to obtain a first foreground image texture coordinate; and perform a second coordinate rotation processing on the first foreground image texture coordinate, by using a second predetermined rotation formula based on the predetermined rotation parameter, to obtain a second foreground image texture coordinate.

In a possible implementation, when the coordinate scaling processing is performed on the foreground image texture coordinate after the coordinate rotation process, based on the first predetermined scaling parameter, the processing module is configured to:

perform the coordinate scaling processing on the second foreground image texture coordinate based on the first predetermined scaling parameter, to obtain a third foreground image texture coordinate.

In a possible implementation, when the coordinate translation processing is performed on the foreground image texture coordinate after the coordinate scaling process, based on the predetermined translation vector and the predetermined translation time length, the processing module is configured to:

perform a translation processing on the third foreground image texture coordinate, by using a predetermined translation formula based on the predetermined translation vector and the predetermined translation time length, at each predetermined translation moment of the predetermined translation time length.

In a possible implementation, the device further includes a rotating module.

The rotation module is configured to perform a third coordinate rotation processing on the third foreground image texture coordinate, by using a third predetermined rotation formula based on the predetermined rotation center, to obtain a fourth foreground image texture coordinate.

When the translation processing is performed on the third texture coordinate by using the predetermined translation formula based on the predetermined translation vector and the predetermined translation time length, at each predetermined translation moment of the predetermined translation time length, the processing module is configured to:

perform the translation processing on the fourth foreground image texture coordinate, by using the predetermined translation formula based on the predetermined translation vector and the predetermined translation time length, at each predetermined translation moment of the predetermined translation time length.

In a possible implementation, when the first 2D sticker image is rotated, scaled and translated, the processing module is configured to rotate, scale and translate each sticker texture coordinate of the first 2D sticker image.

When each sticker texture coordinate of the first 2D sticker image is rotated, scaled and translated, the processing module is configured to:

perform a coordinate rotation processing on the sticker texture coordinate, based on a predetermined rotation center and a predetermined rotation parameter;

perform, based on a first predetermined scaling parameter, a coordinate scaling processing on a sticker texture coordinate after the coordinate rotation processing; and perform, based on a predetermined translation vector and a predetermined translation time length, a coordinate translation processing on a sticker texture coordinate after the coordinate scaling processing.

In a possible implementation, the original image is a 4-channel image with a R channel, a G channel, a B channel and an A channel.

The first mixing module is configured to mix a R channel of the second foreground image with a R channel of the background image, to mix a G channel of the second foreground image with a G channel of the background image, and to mix a B channel of the second foreground image with a B channel of the background image, according to an A channel of the second foreground image.

In a possible implementation, the device further includes a filter module.

The filter module is configured to add a filter layer to the first mixed image to obtain a second mixed image.

The second mixing module is configured to mix the second mixed image with the second 2D sticker image.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, the scope of the present disclosure may cover a technical solution formed by replacing the features described above with technical features with similar functions disclosed in (but not limited to) the present disclosure.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A method for generating an animation, comprising:
determining a background image and a first foreground image of an original image;
rotating, scaling and translating the first foreground image to obtain a second foreground image; and rotating, scaling and translating a first 2D sticker image to obtain a second 2D sticker image, wherein the first 2D sticker image is generated in advance from the original image based on a predetermined covering manner;
mixing the second foreground image with the background image to obtain a first mixed image; and
mixing the first mixed image with the second 2D sticker image to generate an animation of the original image.

2. The method according to claim 1, wherein determining the background image of the original image comprises:
performing a first scaling processing on the original image by a first predetermined scaling factor based on a first predetermined image edge to obtain a first scaled image, and performing a Gaussian blurring processing on the first scaled image to obtain the background image; and
determining the first foreground image of the original image comprises:
performing a second scaling processing on the original image by a second predetermined scaling factor based on a second predetermined image edge, to obtain the first foreground image, wherein the first foreground image includes a blank area and an original image area after the second scaling processing, and an aspect ratio of the original image area after the second scaling processing is consistent with an aspect ratio of the original image.

3. The method according to claim 1, wherein the rotating, scaling and translating the first foreground image comprises:
rotating, scaling and translating each foreground image texture coordinate of the first foreground image.

4. The method according claim 3, wherein rotating, scaling and translating the first 2D sticker image comprises:
rotating, scaling and translating each sticker texture coordinate of the first 2D sticker image.

5. The method according to claim 4, wherein the rotating, scaling and translating each sticker texture coordinate of the first 2D sticker image comprises:
performing a coordinate rotation processing on the sticker texture coordinate, based on a predetermined rotation center and a predetermined rotation parameter;
performing, based on the first predetermined scaling parameter, the coordinate scaling processing on a sticker texture coordinate after the coordinate rotation processing; and
performing, based on a predetermined translation vector and a predetermined translation time length, the coordinate translation processing on a sticker texture coordinate after the coordinate scaling processing.

6. The method according to claim 3, wherein the rotating, scaling and translating each foreground image texture coordinate of the first foreground image comprises:
performing a coordinate rotation processing on the foreground image texture coordinate, based on a predetermined rotation center and a predetermined rotation parameter;
performing, based on a first predetermined scaling parameter, a coordinate scaling processing on a foreground image texture coordinate after the coordinate rotation processing; and
performing, based on a predetermined translation vector and a predetermined translation time length, a coordinate translation processing on a foreground image texture coordinate after the coordinate scaling processing.

7. The method according to claim 6, wherein the performing a coordinate rotation processing on the foreground image texture coordinate, based on the predetermined rotation center and the predetermined rotation parameter comprises:
performing a first coordinate rotation processing on the foreground image texture coordinate by using a first predetermined rotation formula based on the predetermined rotation center, to obtain a first foreground image texture coordinate; and
performing a second coordinate rotation processing on the first foreground image texture coordinate by using a second predetermined rotation formula based on the predetermined rotation parameter, to obtain a second foreground image texture coordinate.

8. The method according to claim 7, wherein the performing, based on the first predetermined scaling parameter, a coordinate scaling processing on a foreground image texture coordinate after the coordinate rotation processing comprises:

performing the coordinate scaling processing on the second foreground image texture coordinate, based on the first predetermined scaling parameter, to obtain a third foreground image texture coordinate.

9. The method according to claim 8, wherein the performing, based on a predetermined translation vector and a predetermined translation time length, a coordinate translation processing on a foreground image texture coordinate after the coordinate scaling processing comprises:

performing the translation processing on the third foreground image texture coordinate, by using a predetermined translation formula according to the predetermined translation vector and the predetermined translation time length, at each predetermined translation moment of the predetermined translation time length.

10. The method according to claim 9, wherein before performing the translation processing on the third foreground image texture coordinate, by using the predetermined translation formula according to the predetermined translation vector and the predetermined translation time length, at each predetermined translation moment of the predetermined translation time length, the method further comprises:

performing a third coordinate rotation processing on the third foreground image texture coordinate by using a third predetermined rotation formula based on the predetermined rotation center, to obtain a fourth foreground image texture coordinate; and wherein the performing the translation processing on the third foreground image texture coordinate, by using a predetermined translation formula according to the predetermined translation vector and the predetermined translation time length, at each predetermined translation moment of the predetermined translation time length comprises:

performing the translation processing on the fourth foreground image texture coordinate, by using the predetermined translation formula based on the predetermined translation vector and the predetermined translation time length, at each predetermined translation moment of the predetermined translation time length.

11. The method according to claim 1, wherein the original image is a 4-channel image with a R channel, a G channel, a B channel and an A channel; and wherein the mixing the second foreground image with the background image comprises:

mixing a R channel of the second foreground image with a R channel of the background image, mixing a G channel of the second foreground image with a G channel of the background image, and mixing a B channel of the second foreground image with a B channel of the background image, according to an A channel of the second foreground image.

12. The method according to claim 1, wherein before mixing the first mixed image with the second 2D sticker image, the method further comprises:

adding a filter layer to the first mixed image to obtain a second mixed image; and wherein the mixing the first mixed image with the second 2D sticker image comprises:

mixing the second mixed image with the second 2D sticker image.

13. A device for generating an animation, comprising:
a memory;
a processor; and
a computer program stored on the memory and executable on the processor, wherein the computer program, when executed by the processor, causes the processor to:

determine a background image and a first foreground image of an original image;

rotate, scale and translate the first foreground image to obtain a second foreground image; and rotate, scale and translate a first 2D sticker image to obtain a second 2D sticker image, wherein the first 2D sticker image is generated in advance from the original image based on a predetermined covering manner;

mix the second foreground image with the background image to obtain a first mixed image; and mix the first mixed image with the second 2D sticker image to generate an animation of the original image.

14. The device according to claim 13, wherein the computer program, when executed by the processor, causes the processor to:

perform a first scaling processing on the original image by a first predetermined scaling factor based on a first predetermined image edge to obtain a first scaled image, and perform a Gaussian blurring processing on the first scaled image to obtain the background image; and perform a second scaling processing on the original image by a second predetermined scaling factor based on a second predetermined image edge, to obtain the first foreground image, wherein the first foreground image includes a blank area and an original image area after the second scaling processing, and an aspect ratio of the original image area after the second scaling processing is consistent with an aspect ratio of the original image.

15. The device according to claim 13, wherein the computer program, when executed by the processor, causes the processor to:

rotate, scale and translate each foreground image texture coordinate of the first foreground image.

16. The device according to claim 15, wherein the computer program, when executed by the processor, causes the processor to:

perform a coordinate rotation processing on the foreground image texture coordinate, based on a predetermined rotation center and a predetermined rotation parameter;

perform, based on a first predetermined scaling parameter, a coordinate scaling processing on a foreground image texture coordinate after the coordinate rotation processing; and perform, based on a predetermined translation vector and a predetermined translation time length, a coordinate translation processing on a foreground image texture coordinate after the coordinate scaling processing.

17. The device according to claim 16, wherein the computer program, when executed by the processor, causes the processor to:

perform a first coordinate rotation processing on the foreground image texture coordinate by using a first predetermined rotation formula based on the predetermined rotation center, to obtain a first foreground image texture coordinate; and perform a second coordinate rotation processing on the first foreground image texture coordinate by using a second predetermined rotation formula based on the predetermined rotation parameter, to obtain a second foreground image texture coordinate.

18. The device according to claim 17, wherein the computer program, when executed by the processor, causes the processor to:

perform the coordinate scaling processing on the second foreground image texture coordinate, based on the first predetermined scaling parameter, to obtain a third foreground image texture coordinate.

19. The device according to claim 18, wherein the computer program, when executed by the processor, causes the processor to:

perform the translation processing on the third foreground image texture coordinate, by using a predetermined translation formula according to the predetermined translation vector and the predetermined translation time length, at each predetermined translation moment of the predetermined translation time length.

20. A non-transitory computer-readable storage medium storing a computer program thereon, wherein the computer program, when executed by a processor, causes the processor to:

determine a background image and a first foreground image of an original image;

rotate, scale and translate the first foreground image to obtain a second foreground image; and rotate, scale and translate a first 2D sticker image to obtain a second 2D sticker image, wherein the first 2D sticker image is generated in advance from the original image based on a predetermined covering manner;

mix the second foreground image with the background image to obtain a first mixed image; and mix the first mixed image with the second 2D sticker image to generate an animation of the original image.

* * * * *